(12) United States Patent
Muller et al.

(10) Patent No.: US 6,405,845 B1
(45) Date of Patent: Jun. 18, 2002

(54) HYDRAULIC DAMPER

(75) Inventors: Patrick Muller, Sevran; Laurent Compain, Saran, both of (FR)

(73) Assignee: Automotive Products France SA, Chevilly (FR)

( * ) Notice: Subject to any disclaimer, the term of this patent is extended or adjusted under 35 U.S.C. 154(b) by 0 days.

(21) Appl. No.: 09/661,528

(22) Filed: Sep. 14, 2000

(30) Foreign Application Priority Data

Sep. 15, 1999 (GB) .............................................. 9921683

(51) Int. Cl.$^7$ .............................................. F16D 13/60
(52) U.S. Cl. ................................ 192/30 V; 192/109 F; 192/109 D; 188/380
(58) Field of Search .......................... 192/30 V, 109 F, 192/109 D; 60/591, 469; 138/31, 45, 46; 188/378, 379, 380, 322.19

(56) References Cited

U.S. PATENT DOCUMENTS

| | | | | |
|---|---|---|---|---|
| 4,802,561 A | * | 2/1989 | Knecht et al. | ............... 188/318 |
| 4,986,404 A | * | 1/1991 | Kajitani et al. | ........... 192/109 F |
| 4,993,523 A | * | 2/1991 | Schwemmer et al. | ........ 188/299 |
| 4,998,609 A | * | 3/1991 | Nix et al. | ................. 192/109 F |
| 5,320,203 A | * | 6/1994 | Wilber et al. | ............. 192/109 F |
| 6,101,811 A | * | 8/2000 | Nix et al. | ...................... 60/592 |

* cited by examiner

Primary Examiner—Charles A. Marmor
Assistant Examiner—Saúl Rodríguez
(74) Attorney, Agent, or Firm—Paul E Milliken; Ray L Weber

(57) ABSTRACT

A hydraulic damper (10) for damping vibrations in the fluid flow path between a hydraulic pressure source and an associated hydraulic consumer comprises a cylinder (11) having a bore (19). A piston (12) is sidably received in the bore and has a sealing means (30) in contact with the bore to define on one side of the sealing means a first chamber (13) for connection with the hydraulic pressure source and on the other side of the sealing means a second chamber (14) for connection with the associated hydraulic consumer. The cylinder has a sealing zone (20) which in a first operative state of the damper is contacted by the sealing means. The piston (12) is capable in response to an increase in hydraulic pressure in the first chamber (13) of moving in the bore to reduce the volume of the second chamber (14) such that eventually the sealing means (30) moves out of the sealing zone to open fluid flow means (22) through which hydraulic fluid can flow from the first chamber to the second chamber. The piston is also being capable in response to an increase in hydraulic pressure in the second chamber (14) of moving in the bore to reduce the volume of the first chamber (13) such that eventually the sealing means moves out of the sealing zone to open fluid flow means (21) through which hydraulic fluid can flow from the second chamber to the first chamber.

26 Claims, 4 Drawing Sheets

HYDRAULIC DAMPER

FIELD OF THE INVENTION

The invention is concerned with hydraulic dampers for damping vibrations in the fluid flow path between a hydraulic pressure source and an associated hydraulic consumer. The invention is particularly, though not exclusively, applicable for use in a hydraulic actuation system for a clutch on a motor vehicle.

BACKGROUND OF THE INVENTION

It is known to provide a hydraulic actuation system for operating the clutch of a motor vehicle. Typically such systems comprise a clutch master cylinder which is hydraulically linked with a slave cylinder. The master cylinder is actuated via a pedal located inside the vehicle such that when the pedal is depressed the slave cylinder is actuated to operate the clutch in a known manner. It is also known to provide a hydraulic actuation system for a clutch in which the master cylinder is operated via an electric actuator or in which a hydraulic accumulator is used as a source of hydraulic pressure. Such systems are used to enable automatic or semiautomatic operation of the clutch.

Motor vehicles having a hydraulic clutch actuation system can suffer the disadvantage that vibrations produced in the drive train are transmitted through the hydraulic actuation system. These vibrations may have a detrimental effect on the operation of the actuation system and in manually operated clutches can be felt through the clutch control pedal by a driver of the vehicle. The propagated vibrations can also generate noise in the fire wall of the vehicle and can also lead to pedal growl and clutch roar all which is audible to the occupants of the vehicle.

To attenuate the propagation of these vibrations through the hydraulic actuation system it is known to fit a hydraulic damper in the flow path between the clutch master cylinder, or other hydraulic pressure source, and the clutch slave cylinder to filter out vibrations in the hydraulic fluid. Such a damper is known for example from U.S. Pat. No. 5,320,203. Whilst such dampers have been effective in attenuating the propagated vibrations, there is a need to produce a damper which is both cheap to manufacture and reliable in operation. There is also a need to provide a damper which does not cause an unacceptable increase in the pedal load during disengagement of the clutch or an unacceptable increase in the time taken for the clutch pedal to return to its rest position during clutch re-engagement.

It is an object of the present invention to provide an improved hydraulic damper which meets the above needs.

SUMMARY OF THE INVENTION

According to a first aspect of the present invention there is provided a hydraulic damper for damping vibrations in the fluid flow path between a hydraulic pressure source and an associated hydraulic consumer, the damper comprising a cylinder having a bore, a piston slidably received in the bore and having sealing means in contact with the bore to define on one side of the sealing means a first chamber for connection with the hydraulic pressure source and on the other side of the sealing means a second chamber for connection with the associated hydraulic consumer, the cylinder bore having a sealing zone which in a first operative state of the damper is contacted by the sealing means, the piston being capable in response to an increase in hydraulic pressure in the first chamber relative to the pressure in the second chamber of moving in the bore to reduce the volume of the second chamber such that eventually the sealing means moves out of the sealing zone opening fluid flow means through which hydraulic fluid can flow from the first chamber to the second chamber, the piston also being capable in response to an increase in hydraulic pressure in the second chamber relative to the pressure of the first chamber of moving in the bore to reduce the volume of the first chamber such that eventually the sealing means moves out of the sealing zone opening fluid flow means through which hydraulic fluid can flow from the second chamber to the first chamber.

According to a second aspect of the invention, there is provided a hydraulic clutch actuation system having a hydraulic damper according to the first aspect of the invention.

BRIEF DESCRIPTION OF THE DRAWINGS

The invention will now be described by way of example only with reference to the following drawings in which.

DETAILED DESCRIPTION OF THE INVENTION

Figure 1:
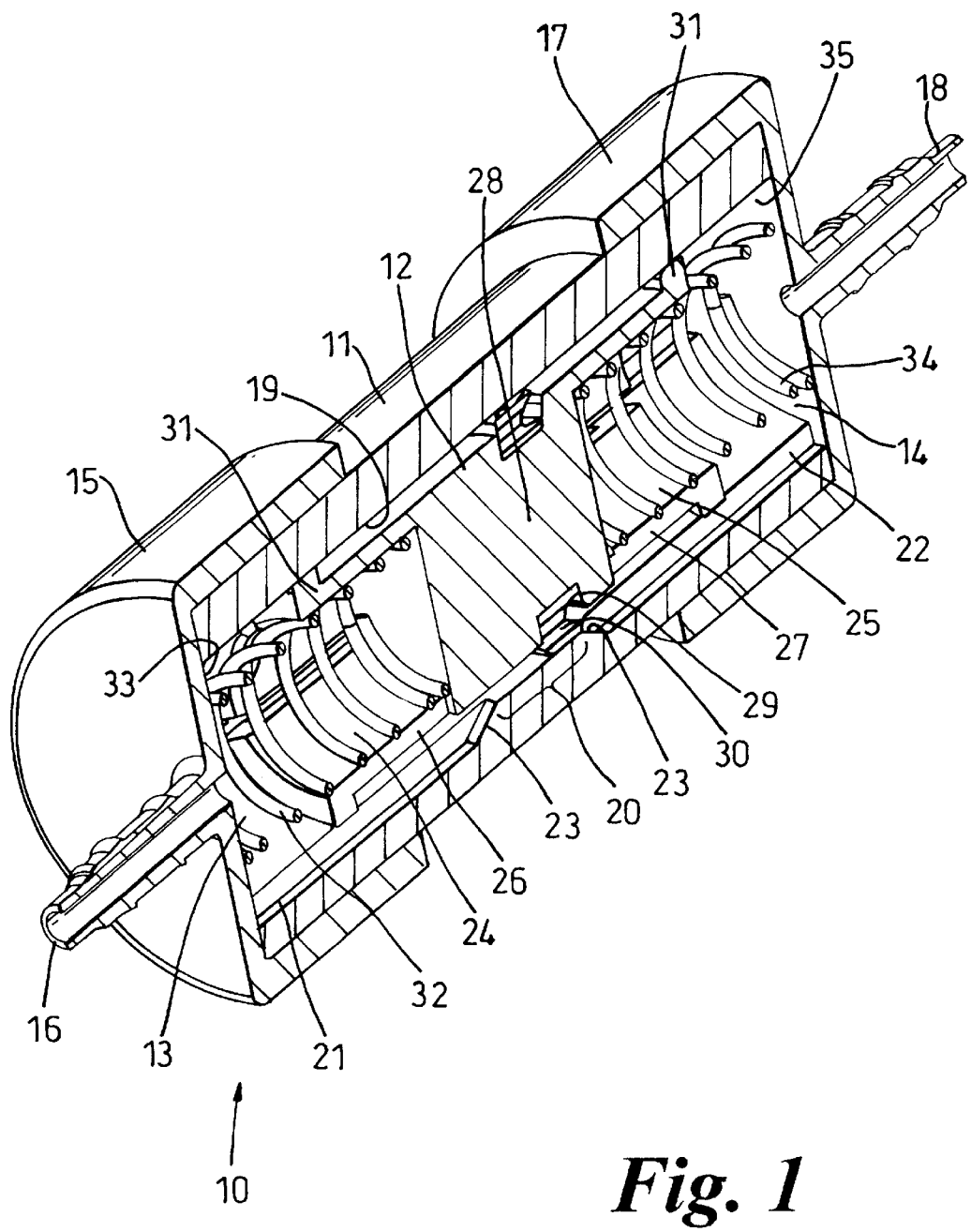
FIG. 1 is a perspective view in cross section of a first damper according to the invention.
Figure 2:
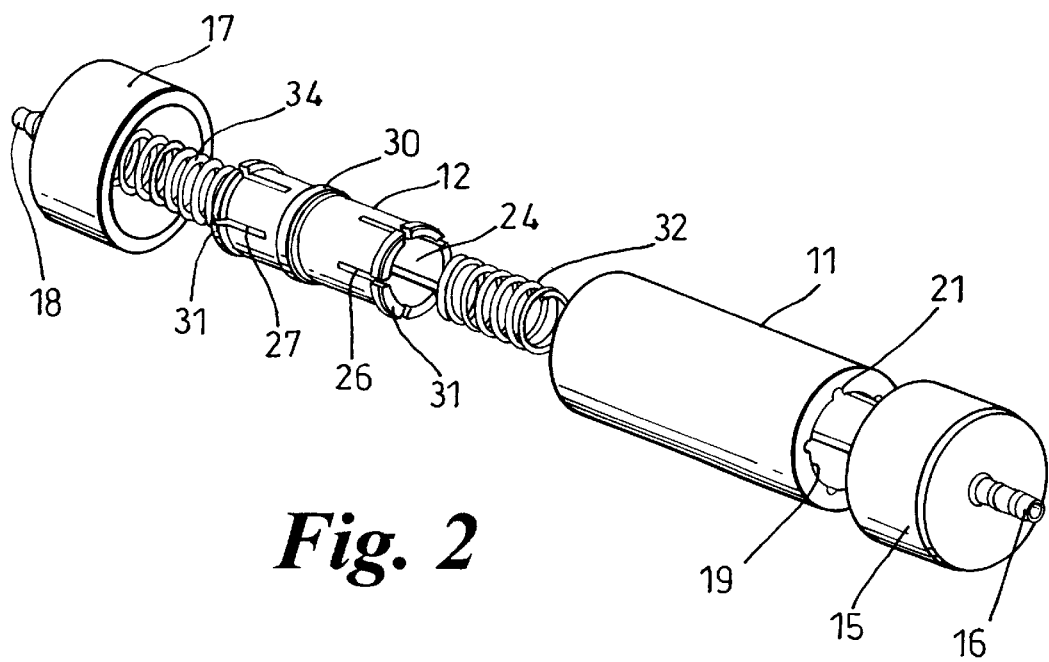
FIG. 2 is an exploded view of the damper of FIG. 1.

FIGS. 1 to 3 show a hydraulic damper 10 including a generally cylindrical body 11 having a central bore 19 extending therethrough. A piston 12 is slidably received in the bore 19 and has a seal 30. The seal 30 sealingly contacts the bore 19 to define on one side thereof a first chamber 13 for connection with a source of hydraulic pressure such as a clutch master cylinder (not shown) and on the other side thereof a second chamber 14 for connection with a hydraulic consumer such as a clutch slave cylinder (not shown). A first end cap 15 sealingly engages one end of the cylinder 11 to close the first chamber 13 and has an outlet 16 to which a hydraulic conduit (not shown) can be attached to connect the first chamber 15 to the clutch master cylinder. A second end cap 17 sealingly engages the other end of the cylinder 11 to close the second chamber 14 and has a further outlet 18 to which a further hydraulic conduit (not shown) can be attached to connect the second chamber 14 with the clutch slave cylinder.

The bore 19 of the cylindrical body 11 has a central sealing zone 20. To the left of the sealing zone 20 (as viewed in FIG. 1) five grooves 21 are provided equi-spaced around the bore 19 and which extend axially towards the first end cap 15. Similarly, to the right of sealing zone 20 (as viewed in FIG. 1) a further five grooves 22 are provided equi-spaced about the bore 19 and which extend axially towards the second end cap 17. The grooves 21, 22 each have a tapered portion 23 so that the depth of the grooves reduces as they approach the central sealing zone 20.

The piston 12 is generally cylindrical in shape and has a first bore 24 formed in one end and a second bore 25 formed in the other end. The first bore 24 is in fluid communication with the grooves 21 via a plurality of slots 26 in the wall of the bore 24. The second bore 25 is in fluid communication with the grooves 22 via a plurality of slots 27 in the wall of the bore 25. The number and position of the slots 26, 27 is not essential to the invention and are selected to ensure that the flow of hydraulic fluid is not disturbed. Between the ends of the bores 24, 25 the piston has a solid central region 28. Formed in the external diameter of the central region 28 is a groove 29 which accommodates the seal 30. The groove 29 and seal 30 are axially located towards the right hand end (as viewed in FIG. 1) of the central region 28. An annular flange 31 is provided at either end of the piston 12. Flanges 31 slide in the central bore 19 to help guide the piston 12.

In the embodiment shown, the seal 30 is an elastomer seal. However, the seal can be made from any suitable material such as a plastics material for example. Furthermore, the seal could be provided integrally with the piston. For example, the seal could take the form of an annular sealing land provided around the piston and which is dimensioned to sealingly engage the bore 19.

A first spring 32 is located in the first chamber 13 with one end of the spring contacting an inner surface 33 of the first end cap 15 whilst the other end of the spring is located in the bore 24 so as to contact the central region 28 of the piston. The first spring 32 is arranged to bias the piston towards the second chamber 14. A second spring 34 is located in the second chamber 14 with one end of the spring contacting an inner surface 35 of the second end cap 17 whilst the other end of the spring is located in the bore 25 so that it also contacts the central region 28 of the piston. The second spring 34 is arranged to bias the piston towards the first chamber 13. The bias forces of the first and second springs are selected such that when the pressure in the first and second chambers is equal, the piston adopts the position shown in FIG. 3b with the seal 30 just closing off the grooves 22 in the second chamber 14. This arrangement means that following an initial operation of the actuation system the balance of forces acting on the piston 12 will hold it in the position shown in FIG. 3a when the actuation system is not operating. This results in a higher pressure being retained in the second chamber 14 than in the first chamber 13 to provide a hydraulic pre-load as discussed more fully below.

Operation of the damper in the context of a clutch actuation system will now be described with reference to FIGS. 3a to 3d.

Figure 3A:
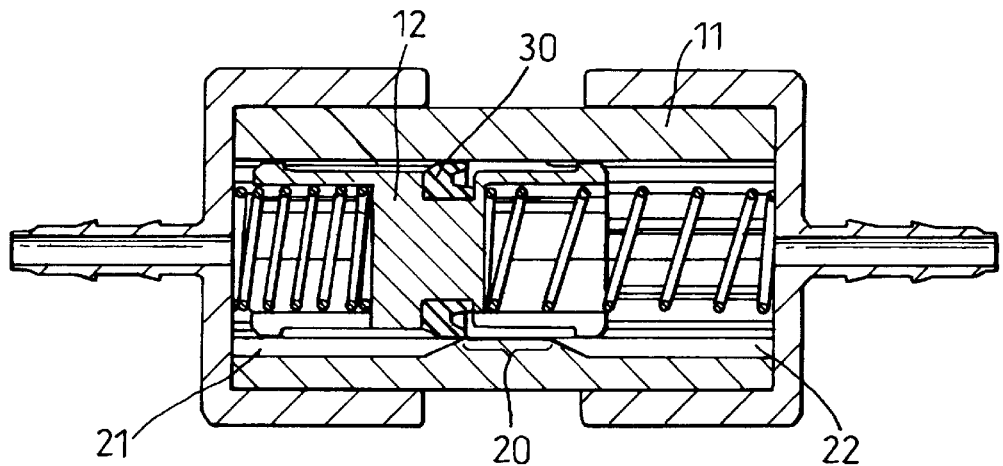
FIGS. 3a to 3c are plan views in cross section of the damper of FIG. 1 showing the damper in various operative states.

FIG. 3a shows a first operative state of the damper when there is no actuation of the clutch master cylinder. As indicated above, the bias forces of the first and second springs 32, 34 are arranged so that the piston is held with the seal 30 engaging the sealing zone 20 at the ends of the grooves 21. In this position the first spring 32 is more compressed than the second spring 34 and the hydraulic pressure in the second chamber 14 is higher then the hydraulic pressure in the first chamber 13.

The difference in hydraulic pressure between the first and second chambers 13, 14 provides a hydraulic pre-load which is applied to the release bearing of the clutch (not shown). The provision of a hydraulic pre-load in this way means that there is no need to provide a pre-load spring in the clutch slave cylinder which simplifies the construction of the slave cylinder. Also the hydraulic pre-load is constant over the life of the clutch which is not the case when the pre-load is provided by a slave cylinder pre-load spring where the force of the pre-load spring varies as the clutch plate wears.

Figure 3B:
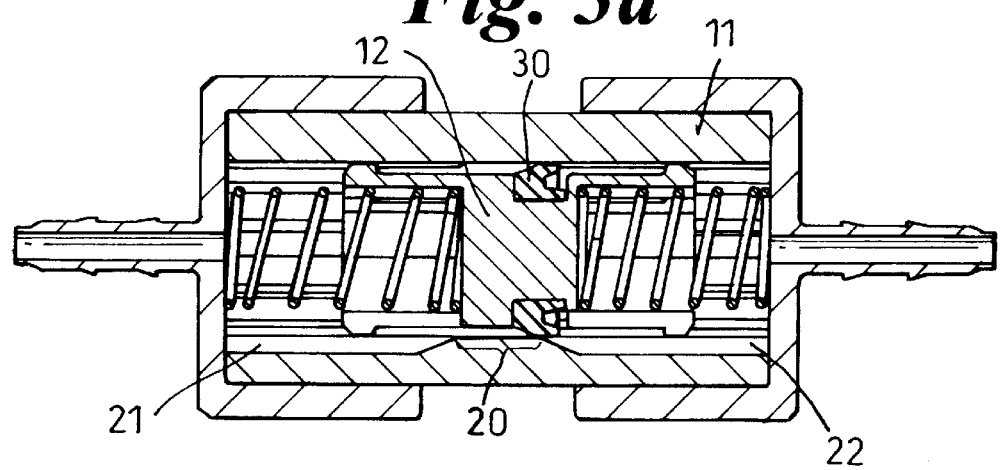

FIG. 3b shows the damper during disengagement of the clutch. As the master cylinder is actuated the pressure in the first chamber 13 increases. When the pressure in the first chamber 13 exceeds the pressure in the second chamber 14, the piston will move in the bore 19 to the right (as viewed in FIG. 3b) reducing the volume of the second chamber until the seal 30 moves off the sealing zone 20 and over the grooves 22. At this point (in which the piston has moved slightly farther to the right than is shown in FIG. 3b) hydraulic fluid can pass through the grooves 22 from the first chamber to the second chamber and from there to the slave cylinder.

Figure 3C:
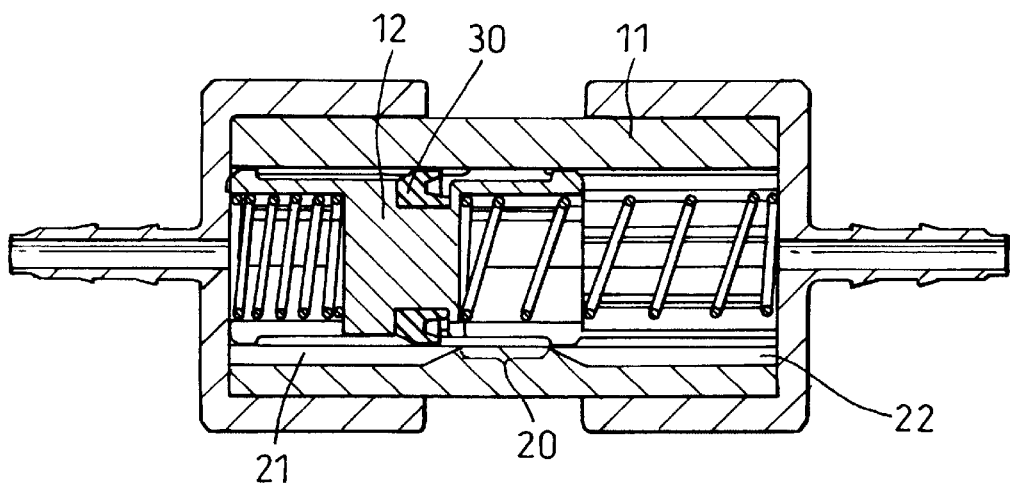

FIG. 3c shows the damper during engagement of the clutch. As the actuation force applied to the master cylinder is reduced, the pressure in the first chamber 13 reduces. At the same time the clutch diaphragm spring fingers acting through the release bearing on the slave cylinder applies a hydraulic load to the second chamber 14 as the clutch is engaged. When the pressure in the second chamber 14 exceeds the pressure in the first chamber 13, the piston will move in the bore 19 to the left (as viewed in FIG. 3c) reducing the volume of the first chamber 13 until the seal 30 moves off the sealing zone 20 and uncovers the grooves 21. At this point hydraulic fluid can pass through the grooves 21 from the second chamber 14 to the first chamber 13 and from there to the clutch master cylinder.

As the fluid passes through the grooves 21 from the second chamber 14 to the first chamber 13, the pressure in the second chamber will drop until the pressure reaches the predetermined hydraulic pre-load at which point the first spring 32 will bias the piston so that the seal 30 again contacts the sealing zone 20 to maintain the pre-load. Thus the damper returns to the first operative state shown in FIG. 3a.

During the clutch disengagement and engagement phases shown in FIGS. 3b and 3c, the hydraulic fluid passes through the grooves 21, 22 which form fluid flow means. The cross sectional area of the grooves is determined so as to filter out vibrations in the fluid emanating from the vehicle drive train. However, because the grooves are tapered 23, the cross sectional area through which the fluid flows can be increased in response to increased pressure differentials between the first and second chambers 13, 14. For example, during clutch disengagement, an increase in pressure in the first chamber 13 with respect to the second chamber 14 will cause the piston to move further to the right (as viewed in FIG. 1). As the seal moves further over the tapered portion 23 of the grooves 22 the cross sectional area of the grooves 22 through which the fluid can pass increases. This helps to ensure that the pedal load is not unacceptably increased whilst effectively dampening vibrations in the fluid.

Similarly, during clutch engagement, an increase in hydraulic pressure in the second chamber 14 relative to the pressure in the first chamber 13 will cause the piston to move further to the left (as viewed in FIG. 1). As the piston moves further over the tapered portion 23 of the grooves 21, the cross sectional area of the grooves through which the fluid can pass increases. This ensures that the time taken for the clutch pedal to return to its rest position is not unacceptably increased by the operation of the damper 10.

Although the embodiment described has five grooves 21, 22 on each side of the sealing zone 20, it will be understood that number of grooves used and the size of the grooves can be varied as necessary to accommodate the required flow of hydraulic fluid through the damper and to provide the required damping characteristics taking into account the rate of the springs and the friction of the seal.

Figure 4:
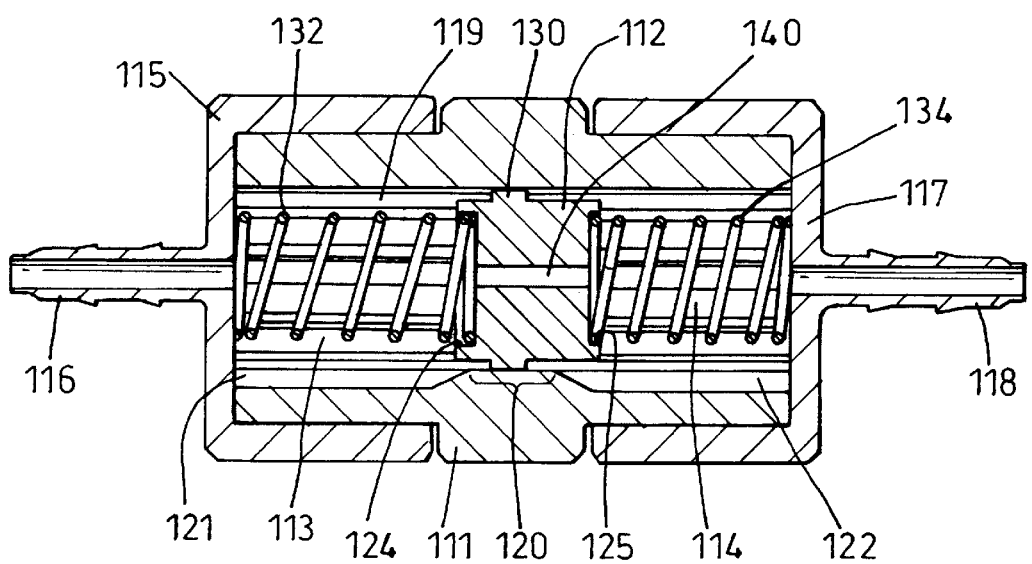
FIG. 4 is a plan view in cross section showing a second damper according to the invention.

FIGS. 4 and 5 show a second damper 110 which is similar to the damper 10 of FIG. 1. The features of the second damper 110 which serve the same function as those of the first damper 10 are given the same reference numeral increase by 100.

The main differences between the second damper 110 and the first damper 10 are in the construction of the piston 112.

The piston 112 does not extend significantly into the first and second chambers 113, 114 and consequently has only small bores 124, 125 on either side of the central region 128 to locate the ends of the springs 132, 134.

The seal 130 is positioned axially towards the left hand end (as viewed in FIG. 4) of the central region 128. In this embodiment the piston seal 130 is produced integrally with the piston as an annular land which is dimensioned so as to sealingly contact the bore 119 of the cylindrical body. It will be apparent, however, that a seal arrangement similar to that shown in damper 10 comprising an elastomer or plastics seal ring could be used.

The piston 112 has a central bore or fluid passage 140 which extends through the piston 112 to fluidly connect the first chamber 113 and the second chamber 114.

Operation of the damper 110 will now be described in the context of a hydraulic clutch actuation system for a motor vehicle with reference to FIGS. 5a to 5c.

Figure 5A:
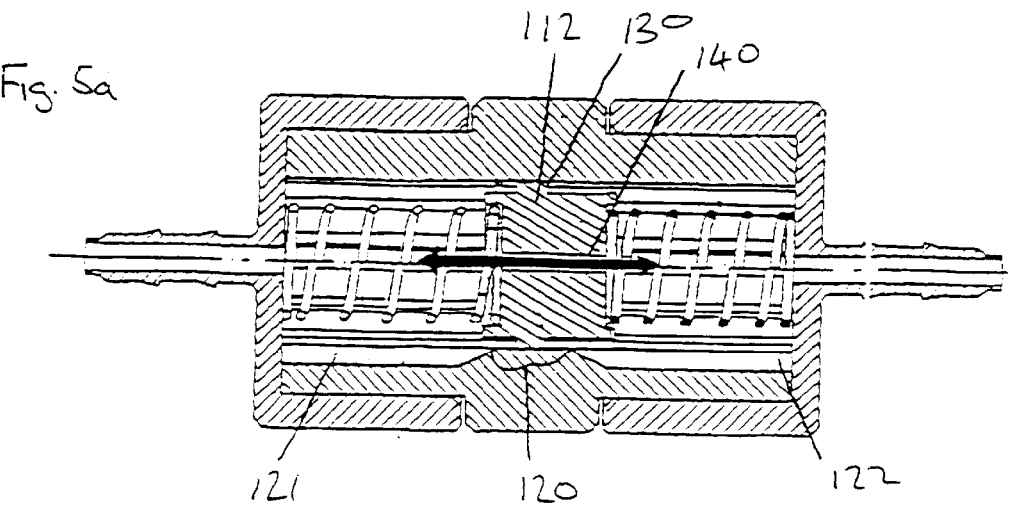
FIGS. 5a to 5c are views similar to that of FIG. 4 showing the damper of FIG. 4 in various operative states.

FIG. 5a shows the damper when the clutch is not being actuated or under conditions of low fluid flow. When the clutch is not actuated, the springs 132, 134 are arranged to axially align the piston 112 so that the seal 130 contacts the sealing zone 120 approximately in the centre thereof. The first and second chambers 113, 114 are in fluid connection via the fluid passage 140 and the pressure in the first and second chambers 113, 114 is equal so that no hydraulic pre-load is created.

Under conditions of low fluid flow during both clutch engagement and disengagement the piston seal 130 remains within the sealing zone 128 and fluid flows between the first and second chambers 113, 114 through the fluid passage 140. The fluid passage 140 acts as a restriction to fluid flow and is dimensioned to filter out vibrations in the hydraulic fluid emanating from the vehicle drive line.

Figure 5B:
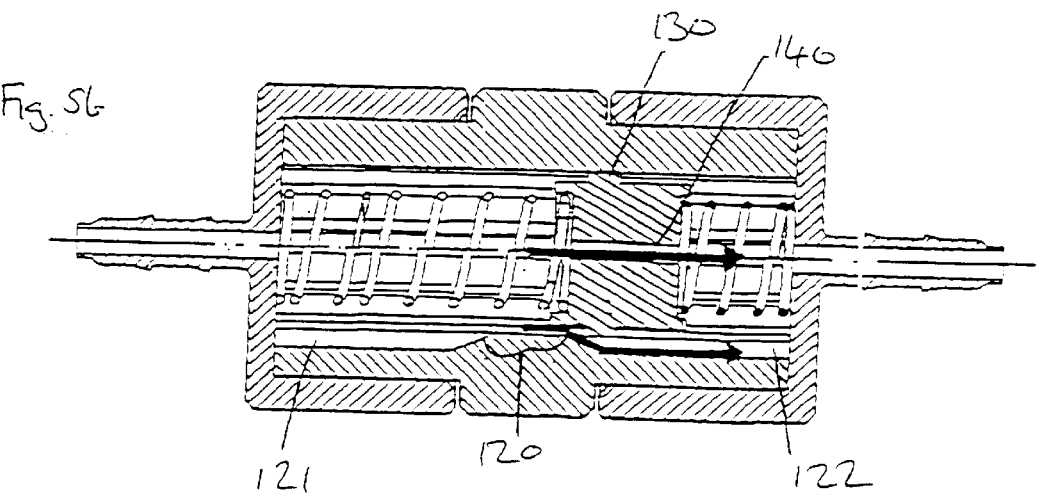

FIG. 5b shows the damper during clutch disengagement under conditions of high fluid flow. The hydraulic pressure in the first chamber 113 increases relative to the pressure in the second chamber 114. As a result the piston moves to the right (as viewed in FIG. 5b) reducing the volume of the second chamber 114 until the seal moves out of the sealing zone 128 and over the grooves 122. At this point the hydraulic fluid can pass from the first chamber 113 to the second chamber 114 through the grooves 122 as well as through the fluid passage 140. The increase in area through which the fluid can flow following opening of the grooves 122 ensures that the pedal load required during disengagement is not unacceptably increased by the damper.

Figure 5C:
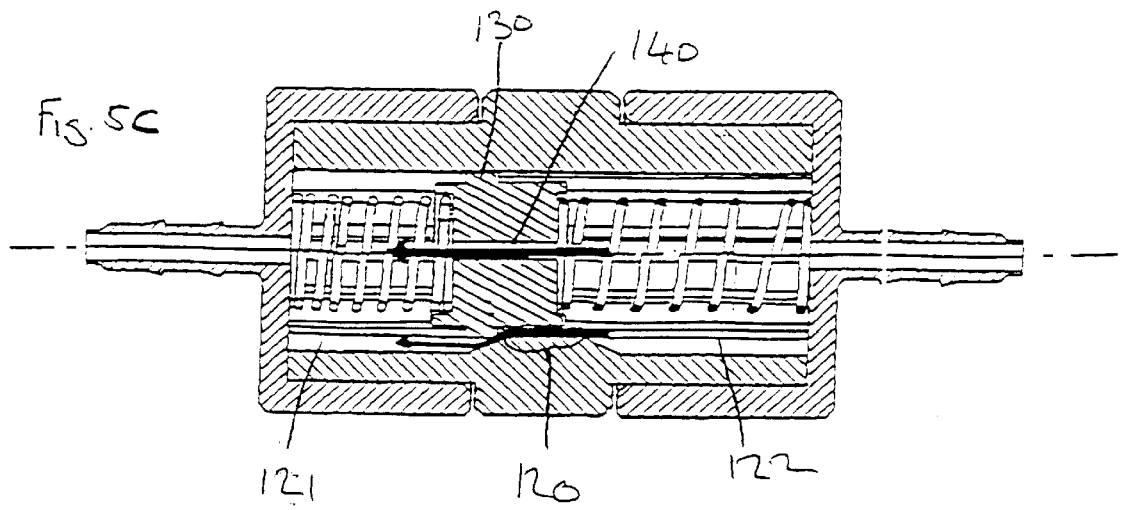

FIG. 5c shows the damper during clutch engagement under conditions of high fluid flow. The hydraulic pressure in the second chamber 114 increases relative to the pressure in the first chamber 113 causing the piston to move to the left (as viewed in FIG. 5c) reducing the volume of the first chamber 114 until the seal moves out of the sealing zone 128 and over the grooves 121. At this point the hydraulic fluid can pass from the second chamber 114 to the first chamber 113 through the grooves 121 as well as through the fluid passage 140. The increase in area through which the fluid can flow following opening of the grooves 121 ensures that the pedal recovery time during clutch engagement is not unacceptably increased by the damper.

In either of the embodiments described above, the components of the dampers 10, 110 can be manufactured from metallic materials, plastics materials or a combination of both.

Whilst both embodiments described above show dampers provided as a separate module for insertion in the hydraulic line connecting a clutch master cylinder and a clutch slave cylinder, it should be understood that dampers according to the invention could be included in either the master cylinder or the slave cylinder to form an integral unit therewith.

Furthermore, whilst the embodiments have been described in the context of a conventional hydraulic clutch actuation system for a motor vehicle having a clutch master cylinder actuated by a pedal and a clutch slave cylinder, the invention is not limited to such an arrangement and could equally be applied to dampers for use in clutch actuation systems wherein the master cylinder is actuated by an electric actuator (such as an electric motor) or where a hydraulic accumulator is used as the source of hydraulic pressure. Dampers according to the invention could also be used in hydraulic systems other than clutch actuation systems where it is necessary to damp vibrations in the hydraulic fluid path between a hydraulic pressure source and an associated hydraulic consumer.

Dampers according to the invention have a particularly simple construction with few moving parts and which lends itself to low cost manufacturing techniques.

What is claimed is:

1. A hydraulic damper for damping vibrations in the fluid flow path between a hydraulic pressure source and an associated hydraulic consumer, the damper comprising a cylinder having a bore, a piston slidably received in the bore and having sealing means in contact with the bore to define on one side of the sealing means a first chamber for connection with the hydraulic pressure source and on the other side of the sealing means a second chamber for connection with the associated hydraulic consumer, the cylinder bore having a sealing zone which in a first operative state of the damper is contacted by the sealing means, the piston being capable in response to an increase in hydraulic pressure in the first chamber relative to the pressure in the second chamber of moving in the bore to reduce the volume of the second chamber such that eventually the sealing means moves out of the sealing zone opening fluid flow means through which hydraulic fluid in the first chamber can flow to the second chamber, the piston also being capable in response to an increase in hydraulic pressure in the second chamber relative to the pressure of the first chamber of moving in the bore to reduce the volume of the first chamber such that eventually the sealing means moves out of the sealing zone opening fluid flow means through which hydraulic fluid in the second chamber can flow to the first chamber.

2. A damper according to claim 1 in which the piston is axially biased by resilient means applying a bias force on either side of the piston.

3. A damper according to claim 2 in which the resilient means comprises a first spring located in the first chamber so as to contact a first face of the piston and a second spring located in the second chamber so as to contact a second face of the piston.

4. A hydraulic damper according to claim 2 in which the bias force on one side of the piston is greater that the bias force acting on the other side of the piston such that in the first operative state of the damper the hydraulic pressure in one of the first or the second chambers is greater than the hydraulic pressure in the other of the first or second chambers.

5. A hydraulic damper according to claim 4 in which in the first operative state the hydraulic pressure in the second chamber is higher than the hydraulic pressure in the first chamber.

6. A hydraulic damper according to claim 2 in which a fluid passage extends through the piston connecting the first and second chambers to permit fluid flow between the first and second chambers through the fluid passage.

7. A hydraulic damper according to claim 6 in which the bias forces of the resilient means are arranged such that in the first operative state of the damper the sealing means contacts the sealing zone substantially centrally thereof.

8. A hydraulic damper according to claim 1 in which the fluid flow means comprises one or more grooves in the cylinder bore located on either side of the sealing zone, the hydraulic fluid flowing between the first and second chambers through the grooves when the sealing means moves off the sealing zone uncovering the grooves.

9. A hydraulic damper according to claim 8 in which the cross sectional area of the grooves increases from a minimum value in a region next to the sealing zone to a maximum value at a point remote from the sealing zone such that as the sealing means moves further over the grooves in response to an increased pressure differential between the first and second chambers, the cross sectional area through which fluid can flow between the first and second chambers increases.

10. A hydraulic damper according to claim 1 in which at least one part of the damper is made from a metallic material.

11. A hydraulic damper according to claim 1 in which at least one part of the damper are made from a plastics material.

12. A hydraulic damper according to claim 1 in which the sealing means comprises a separate seal for sealingly contacting the sealing zone.

13. A hydraulic damper according to claim 12 in which sealing means is an elastomer or plastics seal.

14. A hydraulic damper according to claim 1 in which the cylinder comprises a cylindrical body defining the bore of the cylinder, a first end cap sealingly fitted over a first end of the cylindrical body to define with the piston and the sealing means the first chamber, and a second end cap sealingly fitted over a second end of the cylindrical body to define with the piston and the sealing means the second chamber.

15. A hydraulic damper according to claim 14 in which the first end cap has first outlet means for connection with a source of hydraulic pressure and the second end cap as second outlet means for connection with the hydraulic consumer.

16. A hydraulic clutch actuation system comprising a damper according to claim 1.

17. A hydraulic clutch actuation system according to claim 16 in which the hydraulic consumer is a clutch slave cylinder.

18. A hydraulic clutch actuation system according to claim 16 in which the hydraulic pressure source is a clutch master cylinder.

19. A hydraulic clutch actuation system according to claim 18 in which the clutch master cylinder is electrically actuated.

20. A hydraulic clutch actuation system according to claim 16 in which the hydraulic pressure source is a hydraulic accumulator.

21. A hydraulic clutch actuation system according to claim 16 in which a fluid passage extends through the piston connecting the first and second chambers, the fluid passage being sized so as to damp vibrations generated in an associated drive train and which pass from the hydraulic consumer to the hydraulic pressure source.

22. A hydraulic clutch actuation system according to claim 16 in which the fluid flow means comprises one or more grooves in the cylinder bore located on either side of the sealing zone, the hydraulic fluid flowing between the first and second chambers through at least one of the grooves when the sealing means moves off the sealing zone uncovering at least one of the grooves in which the grooves are sized so as to damp vibrations generated in an associated drive train and which pass from the hydraulic consumer to the hydraulic pressure source.

23. A hydraulic clutch actuation system according to claim 16 in which in the first operative state, the hydraulic pressure in the second chamber is higher than the hydraulic pressure in the first chamber and in which in the first operative state of the damper, the higher hydraulic pressure in the second chamber provides a pre-load on a release bearing of an associated clutch.

24. A hydraulic clutch actuation system according to claim 16 in which the hydraulic damper is provided as a separate module connected in the fluid flow path between the hydraulic pressure source and the hydraulic consumer.

25. A hydraulic clutch actuation system according to claim 16 in which the hydraulic damper is provided as an integral component of the hydraulic pressure source.

26. A hydraulic clutch actuation system according to claim 16 in which the hydraulic damper is provided as an integral component of the hydraulic consumer.

\* \* \* \* \*